United States Patent
Menon et al.

(10) Patent No.: US 11,886,820 B2
(45) Date of Patent: Jan. 30, 2024

(54) SYSTEM AND METHOD FOR MACHINE-LEARNING BASED EXTRACTION OF INFORMATION FROM DOCUMENTS

(71) Applicant: Genpact Luxembourg S.à r.l. II, Luxembourg (LU)

(72) Inventors: Sreekanth Menon, Bangalore (IN); Prakash Selvakumar, Bangalore (IN); Sudheesh Sudevan, Thalassery (IN)

(73) Assignee: Genpact Luxembourg S.à r.l. II, Luxembourg (LU)

( * ) Notice: Subject to any disclaimer, the term of this patent is extended or adjusted under 35 U.S.C. 154(b) by 686 days.

(21) Appl. No.: 17/064,028

(22) Filed: Oct. 6, 2020

(65) Prior Publication Data
US 2022/0108073 A1  Apr. 7, 2022

(51) Int. Cl.
*G06F 40/295* (2020.01)
*G06N 20/00* (2019.01)
(Continued)

(52) U.S. Cl.
CPC ........ *G06F 40/295* (2020.01); *G06F 18/2148* (2023.01); *G06F 18/2155* (2023.01);
(Continued)

(58) Field of Classification Search
CPC ............... G06F 40/295; G06F 18/2148; G06F 18/2155; G06F 18/2193; G06F 18/23213; G06N 20/00
See application file for complete search history.

(56) References Cited

U.S. PATENT DOCUMENTS 9,195,646 B2 * 11/2015 Tsuchida .................. G06N 3/08
9,536,522 B1 * 1/2017 Hall ..................... G06F 16/3344
(Continued)

FOREIGN PATENT DOCUMENTS

WO  WO-2021218024 A1 * 11/2021 ........... G06F 40/295

OTHER PUBLICATIONS

Zhang, Min, Guohua Geng, and Jing Chen. "Semi-supervised bidirectional long short-term memory and conditional random fields model for named-entity recognition using embeddings from language models representations." Entropy 22.2 (2020): 252. (Year: 2020).*

(Continued)

*Primary Examiner* — Brian L Albertalli (57) ABSTRACT

A method and system are provided for training a machine-learning (ML) system/module and to provide an ML model. In one embodiment, a method includes using a labeled entities set to train a machine learning (ML) system, to obtain an ML model, and using the trained ML model to predict labels for entities in an unlabeled entities set, yielding a machine-labeled entities set. One or more individual ML models may be trained and used in this way, where each individual ML model corresponds to a respective document source. The document sources can be identified via classification of a corpus of documents. The prediction of labels provides a respective confidence score for each machine-labeled entity. The method also includes selecting from the machine-labeled entities set, a subset of machine-labeled entities having a respective confidence score at least equal to a threshold confidence score; and updating the labeled entities set by adding thereto the selected subset of machine-labeled entities. The method further includes removing from the machine-labeled entities set the selected subset of machine-labeled entities and deleting labels assigned to the (Continued)

entities in the updated machine-labeled entities set to provide the unlabeled entities set for a next iteration. The method also includes, if a termination condition is not reached, repeating the steps above and, otherwise, storing the ML model.

20 Claims, 4 Drawing Sheets

(51) Int. Cl.
  *G06F 18/214*     (2023.01)
  *G06F 18/21*      (2023.01)
  *G06F 18/23213*   (2023.01)
(52) U.S. Cl.
  CPC .... *G06F 18/2193* (2023.01); *G06F 18/23213* (2023.01); *G06N 20/00* (2019.01)

(56) References Cited

U.S. PATENT DOCUMENTS

| | | | | |
|---|---|---|---|---|
| 11,681,944 B2* | 6/2023 | Bhat | ..................... | G06F 18/211 |
| | | | | 706/12 |
| 2018/0053119 A1* | 2/2018 | Zeng | ..................... | G06F 40/205 |
| 2020/0073882 A1* | 3/2020 | Guggilla | ................ | G06N 3/044 |
| 2021/0149993 A1* | 5/2021 | Torres | ................... | G06F 40/295 |
| 2021/0182912 A1* | 6/2021 | Misra | .................... | G06F 40/295 |
| 2022/0188520 A1* | 6/2022 | Iso-Sipila | ............. | G06F 40/295 |

OTHER PUBLICATIONS

Thomas, Anu, and S. Sangeetha. "An innovative hybrid approach for extracting named entities from unstructured text data." Computational Intelligence 35.4 (2019): 799-826. (Year: 2019).*

Saito, Kuniko, and Kenji Imamura. "Tag confidence measure for semi-automatically updating named entity recognition." Proceedings of the 2009 Named Entities Workshop: Shared Task on Transliteration (NEWS 2009). 2009. (Year: 2009).*

21201295.9—European Search Report dated Mar. 25, 2022.

Kim, Juae et al., "A Bootstrapping Approach With CRF and Deep Learning Models for improving the Biomedical Named Entity Recognition in Multi-Domains," IEEE Access, vol. 7, pp. 70308-70318, XP011728947, Jun. 10, 2019.

Zhang, Hanchu et al., "Bootstrapping Named Entity Recognition in E-Commerce with Positive Unlabeled Learning," arxiv.org, Cornell University Library, May 22, 2020, XP081676649.

Kruger, Frank et al., "A Literature Review on Methods for the Extraction of Usage Statements of Software and Data," Computing in Science and Engineering, IEEE Service Center, Los Alamitos, CA, vol. 22, No. 1, pp. 26-38, Jan. 1, 2020.

Pan, Xuelian et al., "Assessing the Impact of Software on Science: A Bootstrapped Learning of Sofware Entitites in Full-Text Papers," Journal of Informetrics, Elsevier, Amsterdam, vol. 9, No. 4, pp. 860-871, Sep. 10, 2015.

Gaur, Bodhvi et al., "Semi-Supervised Deep Learning Based Named Entity Recognition Model to Parse Education Section of Resumes," Neural Computing and Applications, Springer, London, vol. 33, No. 11, pp. 5705-5718, XP037458572, Sep. 18, 2020.

* cited by examiner

(PRIOR ART)

SYSTEM AND METHOD FOR MACHINE-LEARNING BASED EXTRACTION OF INFORMATION FROM DOCUMENTS

FIELD

This disclosure generally relates to artificial intelligence (AI)/machine learning (ML) techniques and, in particular, to training and use of AI/ML systems to extract information, such as recognition of named entities, from documents.

BACKGROUND

In many applications, ranging widely from manufacturing, scientific discovery, banking, accounting, medical diagnosis and treatment, etc., a large numbers of documents are generated and exchanged. Examples of such documents in the manufacturing context include system/component designs including drawings of machine parts and textual information such as names of parts, part numbers, size parameters (such as, e.g., length, width, height, diameter) of the parts, etc. Some documents may include descriptions of chemical formulae or processing recipes, including names, quantities, and/or flow rates of materials used, and additional information such as time sequences, temperatures, pressures, etc. In the fields of scientific discovery and medical diagnosis and treatment, the documents may include analysis reports, lab reports, etc. In the fields of banking and accounting, examples of documents include bank statements, invoices, purchasing orders, etc.

In general, a document includes graphical information (e.g., drawings and images) and textual information in the form of groups of one or more words and/or one or more characters. In general, any such grouping can be referred to as a sentence. For example, a sentence "HEX NUT D ½ T $7/16$ U 16" may indicate a hexagonal nut having a diameter of ½ inches and a thickness of $7/16$ inches, and that 16 of such nuts are used. In this sentence, the different words or sequences of words (sequences of alpha-numeric characters, in general) can be referred to as different "named entities" (also referred to as "entities") that usually have different meanings. All the entities in a document may be represented as a single sentence or as several sentences.

In the foregoing example, the words "HEX NUT" indicate a type of a part; the words "D ½" and "T $7/16$" indicate two different dimensions of the part; and the words "U 16" indicate a quantity or number of units of the part. Not all the words in a sentence necessarily correspond to different entities, however. For example, in the sentence "Fasting BG is in the normal range" the words "Fasting BG" indicate a type of diagnostic test and the word "normal" indicates a test outcome. The other words, namely, "is," "in," "the," and "range," do not specifically identify any entities.

In general, given a document, automatic extraction of information from that document, including identification of entities in the sentence(s) in the document, is a challenging problem. This is in part because the document can be unstructured or semi-structured, i.e., a scanner/analyzer may not know where in the document certain type of information is provided. In addition, the scanner/analyzer may also not know what type of information is provided in a document to be analyzed.

SUMMARY

Methods and systems for training AI/ML systems and using such systems for recognizing named entities in documents are disclosed. According to one embodiment, a method includes using a labeled entities set to train a machine learning (ML) system, to obtain an ML model, and using the trained ML model to predict labels for entities in an unlabeled entities set, yielding a machine-labeled entities set. One or more individual ML models may be trained and used in this way, where each individual ML model corresponds to a respective document source. The document sources can be identified via classification of a corpus of documents. The prediction of labels provides a respective confidence score for each machine-labeled entity. The method also includes selecting from the machine-labeled entities set, a subset of machine-labeled entities having a respective confidence score at least equal to a threshold confidence score; and updating the labeled entities set by adding thereto the selected subset of machine-labeled entities. The method further includes removing from the machine-labeled entities set the selected subset of machine-labeled entities and deleting labels assigned to the entities in the updated machine-labeled entities set to provide the unlabeled entities set for a next iteration. The method also includes, if a termination condition is not reached, repeating the steps above and, otherwise, storing the ML model.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings.

DETAILED DESCRIPTION

The following disclosure provides different embodiments, or examples, for implementing different features of the subject matter. Specific examples of components and arrangements are described below to simplify the present disclosure. These are merely examples and are not intended to be limiting.

For the sake of simplicity of explanation and brevity, the discussion below uses a concrete example of an invoice as a document from which information can be extracted, i.e., named entities in the invoice can be recognized using various embodiments of the artificial intelligence based/machine-learning (AI/ML) system described herein. It should be understood, however, that embodiments of the AI/ML system (referred to as AI/ML embodiments) are not limited to analyzing and extracting information from invoices only, and can be used to analyze and extract information from and, in particular, identify named entities in any type of documents such as, e.g., system/component designs, processing recipes, scientific-analysis reports, lab reports, bank statements, etc.

An invoice is a transaction document issued by a seller to a buyer that generally lists the quantities and costs of the goods and/or services provided by the seller. Upon receiving and processing an invoice, the buyer makes a payment to the seller based on the amount(s) indicated in the invoice. A medium to large-scale enterprise typically has relationships with hundreds, if not thousands of vendors providing goods and/or services to different departments of the enterprise. As the number of vendors increases, so does the number and types of invoices that need to be processed by the enterprise.

Although all invoices generally provide a listing of goods/services and the price charged for the goods/services, the manner or the format in which this information is presented can generally vary significantly from one type of invoice to another. For example, an invoice from a supplier of raw materials can be very different from an invoice from a parts manufacturer, which can be different from an invoice from a shipper. Different parts manufacturers may also provide differently formatted invoices. As such, the complexity of invoice processing can add up when there are multiple vendors producing multiple invoices for multiple departments.

Some software systems feature automated invoice management and processing. One challenge that these systems face is that the invoices are generally received as physical (paper) documents or are received digitally, e.g., as portable digital format (PDF) documents, via email text, etc. The paper documents can be scanned, and optical character recognition (OCR) can be applied to the scanned and/or other digitally received documents to extract textual information from the documents. Thereafter, the OCRed documents must be parsed to identify their contents, specifically the different entities, and the extracted content including the identified entities must be supplied to invoice management/processing software.

While different entities may have the same meaning, they can have different names. For example, entities "Item No." and "Sr. No." may both refer to the item number. Entities "Product Information" and "Description" may both describe details about the goods/services provided. Entities "Cost" and "Total Cost" may both refer to the total price charged for a particular invoice item. In some cases, however, the entity "Cost" may mean a per-unit cost, and the entity "Invoice Amount" may mean the total price charged for a particular invoice item. In addition to the volume of invoices that need to be processed in a certain time, e.g., in a day, week, etc., the variations in the entities across different invoices makes the task of identifying the different entities and associated content challenging and susceptible to errors. Manually entering the data from invoices into the software can be cumbersome and expensive especially when thousands of invoices from many different vendors are to be processed.

Two techniques that may be used to extract information from documents automatically include using a rule-based system and using a conventional supervised machine-leaning (ML) system. Building a rule-based system to extract entities correctly from an invoice (a document, in general) is a difficult task, in part because the invoices generated by different vendors (documents received from different sources, in general) are in different formats. In a rule-based systems, the rules often depend on the format of the information, and custom rules may be provided with respect to an individual document template to extract entities from documents corresponding to that template. For example, numbers following a string "Invoice #" may be tagged as invoice number.

With many different types of invoices (documents, in general), the number of rules can become too many. They can slow down the processing system to the point where its usage can become impractical. The computational, storage, and/or energy/power resources required by a rule-based system can also become excessive. Moreover, if all the required rules are not captured accurately and presented to the system, the information extraction by the system can be erroneous. Supervised machine-learning systems, such as those that leverage natural language processing (NLP) techniques, can also be used for extraction of entities and other information from invoices (documents, in general), if they are trained adequately to identify and extract entities accurately.

As the number of types of invoices (documents, in general) increases, to train an ML system accurately, a large number of invoice (or document) samples of many different types must be collected, and the entities therein must be labeled manually. The labeled data can then be used to train an ML system to learn a named entity recognition (NER) model that can predict entities from a new invoice (document). Generating a large and diverse training dataset, i.e., a labeled dataset that includes entity samples from virtually all types of invoices (documents, in general) the ML system may be expected to analyze, is a well-known challenging task. It can also be time consuming and expensive, and may quickly become out of date when invoices of a new type, e.g., from a new vendor (documents of a new type from a new source, in general) are received.

Such a training dataset is usually not available and, as such, many ML systems often err in performing predictions, i.e., in identifying and labeling entities in the invoice (document). The prediction accuracy of the trained ML model is critical because wrong predictions, when supplied to the invoice management/processing software, can result discrepancies or errors in the subsequent invoice processing and payment. The same would be true in case of processing of other types of documents that are noted above.

Various embodiments described herein feature an AI/ML system that is trained using a minimized manually labeled training dataset, but can nevertheless perform named entity recognition (NER) (information extraction, in general) accurately. This is achieved, in part, using an iterative, lightly supervised training process described herein. In some embodiments, the overall NER prediction process includes two main stages: (1) Identification of the document source (e.g., a vendor in cases of invoices); and (2) Source-specific NER in documents received from that source. Although the documents received from different sources can have vastly different formats or structures, different documents received from a common source usually tend to have the same format/structure. As such, source-specific NER can be more accurate and/or efficient in general compared to source-agnostic NER. Like the overall prediction process, the training process according to various embodiments is also performed in two main stages: (1) Training an ML system to identify the document source; and (2) Iterative, lightly supervised training of another ML system or systems to perform NER in a source-specific manner.

Figure 1:
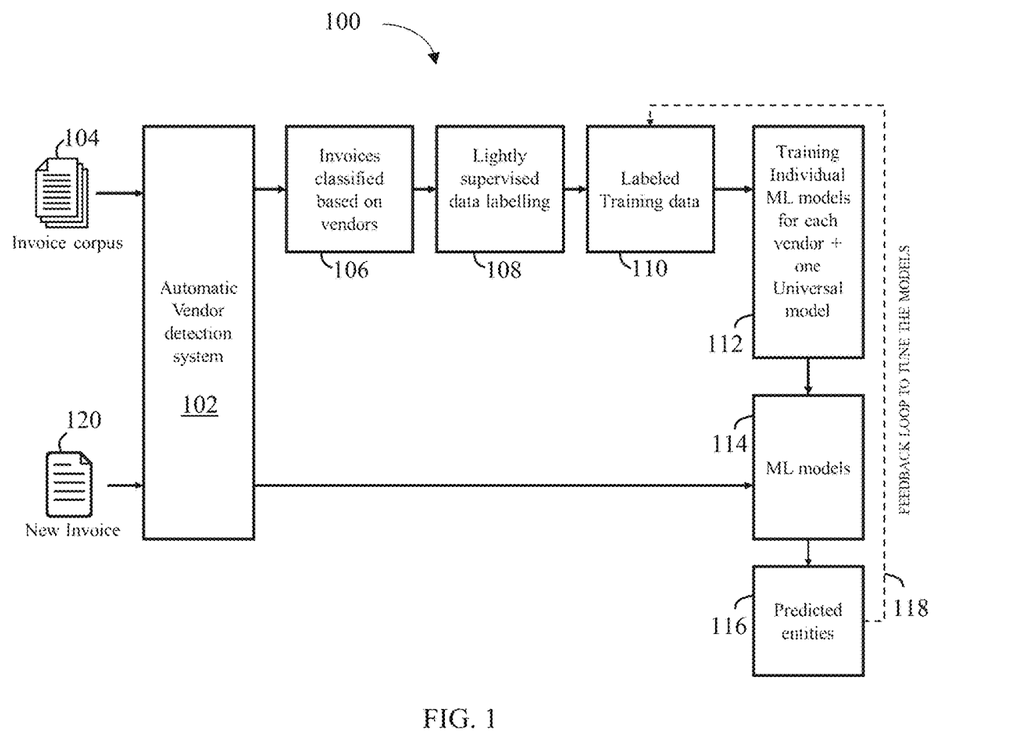
FIG. 1 is a block diagram of a training/prediction system, according to various embodiments.

FIG. 1 is a block diagram showing various operations performed by a training/prediction system 100 during both the training of one or more AI/ML systems and while performing predictions using the trained AI/ML system(s), according to various embodiments. As noted in the discussion below, not all operations are performed during the training phase and, similarly, not all operations are performed during the prediction phase. During the training phase, the automatic vendor (document source, in general) detection system 102 receives a corpus 104 of invoices (documents, in general) of different types. In the discussion below, it should be understood that references to invoices imply references to documents generally, and references to vendors imply references to documents sources, generally.

Rather than identifying all the entities in the received invoices, the vendor detection system 102 only identifies the vendor entity of each invoice, and clusters the invoices by their vendors. The vendor detection system 102 may employ an unsupervised technique, e.g., one or more known clustering techniques. Examples of such clustering techniques include, but are not limited to k-means clustering, mean-shift clustering, expectation-maximization (EM) clustering using Gaussian mixture models (GMM), agglomerative hierarchical clustering, etc.

Alternatively, in some embodiments, the vendor detection system 102 employs a supervised ML technique that may be implemented in a classifier. The ML model used by such a classifier is trained only to detect the vendors and not the other entities in an invoice. To this end, in the corpus of invoices 104 only the entities that identify the vendors supplying the invoices are labeled. In some embodiments, the labeling is performed using the IOB (Inside, Outside, Beginning) or the related IOB-2 formats (discussed below). Examples of such a vendor detection system 102 (referred to as a vendor classifier in the context of some embodiments) include an artificial neural network (ANN), an autoencoder, a deep-learning network, etc. In some embodiments, the ML model used by an ML system to detect vendors can be trained using an embodiment of a lightly supervised training system 100 described with reference to FIG. 1.

Whether employing an unsupervised or a supervised technique, the vendor detection system 102 provides clusters of invoices 106, where the invoices in each cluster are provided by a respective vendor. As such, different invoices in a particular cluster may have the same or similar format or structure. For one or more clusters 106, a respective ML model is generated by training an embodiment of an ML system using an iterative, lightly supervised technique, as discussed below.

For a selected cluster of invoices, the lightly supervised data labeling block 108 provides labeled seed samples. This involves selecting one or more invoices from the selected cluster, where the number of selected invoices is small, i.e., the number of selected invoices does not exceed a small percentage (e.g., 15%, 10%, 4%, 2%, 1%, 0.5%, 0.2%, etc.) of the total number of invoices in the selected cluster. The set of entities in these invoices is referred to as the initial unlabeled sample set. An entity is a sequence of characters, e.g., a group of one or more words that may be included in or form a phrase or a sentence. An entire invoice may be represented using a single sentence or using several sentences. From a selected cluster, invoices having different entities or in which the same or similar entities are found in different sentences and/or at locations may be selected so that the initial sample set is representative of the cluster. The initial unlabeled sample set is generally considered representative when a large fraction (e.g., 60%, 75%, 80%, 90%, or more) of all the entities that are present across the selected cluster are also found in the initial unlabeled sample set. The entities in the initial unlabeled sample set are manually labeled, e.g., by a subject matter expert.

Examples of labeled entities in the selected invoices may include "customer name," "customer ID," "descriptions of goods/services," "quantity of goods supplied," "invoice price for each type of good/service," etc. Different entities may be present in different types of documents, in general. For example, if the documents are lab reports, the entities may include "patient name," "prescribing doctor's name," "insurer's name," "insurer ID," "types of tests performed," "test results," "result classification" (e.g., normal, marginally abnormal, severely abnormal, etc.). Since the number of the invoices selected for manual labeling is small, as described above, labeling of the initial unlabeled sample set can be performed accurately and in a short time (e.g., within a fraction of an hour, a few hours, or days).

By manually labeling the initial unlabeled sample set, a set of manually labeled entities is obtained. The latter set is also referred to as seed samples and forms the initial training dataset 110 for the first training iteration of an iterative training process. A set of labeled entities, whether labeled manually or by an entity classifier as discussed below, is referred to a labeled entities set denoted S. In subsequent iterations, the labeled entities set is updated and forms the updated training dataset 110.

Block 112 generates vendor-specific ML models by training one or more ML systems or embodiments of an ML system. In particular, for a selected cluster, which corresponds to a particular vendor, the corresponding seed samples are used to train an embodiments of an ML system (also called an entity classifier) such as an artificial neural network (ANN), an autoencoder, a deep-learning network, a conditional random fields (CRF) classifier, a long short-term memory (LSTM) classifier, etc. Training of a classifier using a labeled training dataset is well-understood in the field of machine learning. The training of the entity classifier provides an ML model 114 for the selected cluster.

In the predicted entities block 116, the entity classifier for a selected cluster (which corresponds to a particular vendor) so trained is used in the prediction mode to perform predictions for the invoices in the selected cluster that were not selected for providing the seed samples. Even though the entity classifier is operated in the training mode, this is done as part of the on-going training phase. The invoices processed by the trained entity classifier include entities that, prior to the prediction operation, are unlabeled. The set of unlabeled entities from those invoices in the selected cluster that are processed by the trained entity classifier are referred to as a prediction set, denoted P. As noted above, if the initial unlabeled sample set is representative of the selected cluster, it is likely that many of the unlabeled entities in the prediction set P are the same as or similar to the labeled entities that form the seed samples. In the prediction mode, the entity classifier attempts to label the entities in the prediction set, providing a classifier-labeled entities set (also referred to as machine-labeled entities set).

For various entities from the prediction set P that are labeled by the entity classifier, the entity classifier also designates a confidence score indicating the likelihood that the classifier's labeling is correct. The predicted entities block 116 may select from the classifier-labeled entities set entities that are associated with a high confidence score (e.g., greater than 50%, 60%, 75%, 95%, etc.), for another iteration of the training process, as indicated by the path 118. The set of the selected classifier-labeled entities is denoted C.

In general, for the next iteration of the training process, the classifier-labeled entities that are associated with a high confidence score (i.e., the set C) are added to the labeled entities set (S) that was used in the current iteration. The updated labeled entities set forms the updated labeled training dataset 110 for the next iteration. The size of the labeled training dataset thus increases. Using the updated labeled training dataset 110, block 112 retrains the entity classifier in the next iteration, to provide an updated ML model 114. In general, due to the larger labeled training dataset, the prediction accuracy of the entity classifier can improve.

For the next iteration of the training process, the classifier-labeled entities that are associated with a high confidence score are removed from the prediction set (P), to obtain an updated prediction set. Moreover, from the classifier-labeled entities set, the labeling of the entities that are associated with a low confidence score (i.e., a confidence score not designated as a high confidence score) is deleted, and these entities are retained in the prediction set (P) as unlabeled entities. During the next iteration of the overall training process, the retrained entity classifier is used to label the updated prediction set, to obtain a new classifier-labeled entities set. The above described process is then repeated until a termination condition (discussed below) is reached. When the termination condition is reached, the entity classifier is fully trained to analyze invoices in the selected cluster, and provides the final ML model 114 for the selected cluster.

Table 1 below shows the different entity sets that are generated and used in different iterations of the overall training process. In Table 1, the subscript of a set symbol corresponds to the particular iteration of the training process. The set of all unlabeled entities in all the invoices belonging to a selected cluster is denoted E. The set of labeled entities is denoted S. In the first iteration, the set S includes the manually labeled entities, i.e., the seed samples. In subsequent iterations, the S additionally includes the entities labeled by the entity classifier with a high confidence score; these entities are denoted C. The unlabeled entities from the set E that are not included in the set of labeled entities S are denoted P, and are analyzed by the entity classifier to perform predictions during the overall training process, as described above. This iterative training process may be repeated for one or more other clusters that correspond to different vendors, to obtain several vendor-specific ML models 114 for different vendors.

In some embodiments, the training is performed in a cluster/vendor agnostic manner. Specifically, the initial unlabeled sample set, i.e., a set of unlabeled entities, is not selected from a particular cluster. Instead, a set of invoices is selected directly from the corpus of invoices 104, and the entities in the selected invoices are labeled manually to provide the seed samples, i.e., the labeled training data 110 for the first iteration. In this case, the classifier training operation in the block 112 yields a universal ML model 114, i.e., a model that is not specific to a particular vendor, and provides a universal entity classifier instead of a vendor-specific entity classifier.

In block 116, the trained universal entity classifier labels the unlabeled entities in the invoices in the corpus of invoices 104 and selects the classifier-labeled entities having a high confidence score. Via the path 118, the selected entities are added to the labeled training data 110, and the training process is iterated as discussed above, but in a cluster-agnostic manner. Upon reaching a termination condition, the universal entity classifier is fully trained to analyze invoices without the knowledge of the vendor supplying the invoice, and provides the final universal ML model 114. The universal ML model and the universal entity classifier can be used when invoices from a new vendor are received.

TABLE 1

Sets of Entities Used in the Training Process

| Iteration | Labeled Entities Set | Prediction Set | High Confidence Classifier-Labeled Entities Set | Low Confidence Classifier-Labeled Entities Set |
|---|---|---|---|---|
| 1 | $S_1$ | $P_1 \triangleq E/S_1$ | $C_1 \subset P_1$ | $P_1/C_1$ |
| 2 | $S_2 = S_1 \cup C_1$ | $P_2 \triangleq E/S_2$ | $C_1 \subset P_2$ | $P_2/C_2$ |
| . | . | . | . | . |
| . | . | . | . | . |
| . | . | . | . | . |
| k | $S_k = S_1 \cup C_1 \cup \ldots \cup S_{k-1}$ | $P_k \triangleq E/S_k$ | $C_k \subset P_k$ | $P_k/C_k$ |

During the prediction phase, the automatic vendor detection system 102 receives a new invoice 120. The automatic vendor detection system 102 determines the vendor associated with the invoice. To this end, the automatic vendor detection system 102 may employ clustering or may use a vendor classifier that is trained as described above. Once the vendor of the invoice is detected, the block 114 selects the ML model corresponding to that vendor, and the block 116 performs entity prediction for the invoice using the selected ML model. If the new invoice 120 is received from a new vendor, i.e., from a vendor from whom no invoices were received previously, the automatic vendor detection system 102 may not be able to determine the vendor of the new invoice 120. In that case, the block 114 may select the universal ML model, using which the block 116 can perform entity prediction.

In some embodiments, during the prediction phase, a feedback mechanism monitors the prediction accuracy and may fine tune the ML-model(s) for improving its performance over time. The feedback mechanism may include monitoring manually, by a human expert, the predictions made using the ML-model(s). The expert may identify any inaccurate predictions. If the total number and/or the rate of inaccuracies increases beyond a specified acceptable level, retraining the ML-model(s) may be triggered. During retraining, the correctly labeled entities (which were incorrectly labeled by an embodiment of the trained ML system) can be included in the initial training dataset, allowing refining or fine tuning of the entity classifier(s) and the associated ML-model(s).

Figure 2:
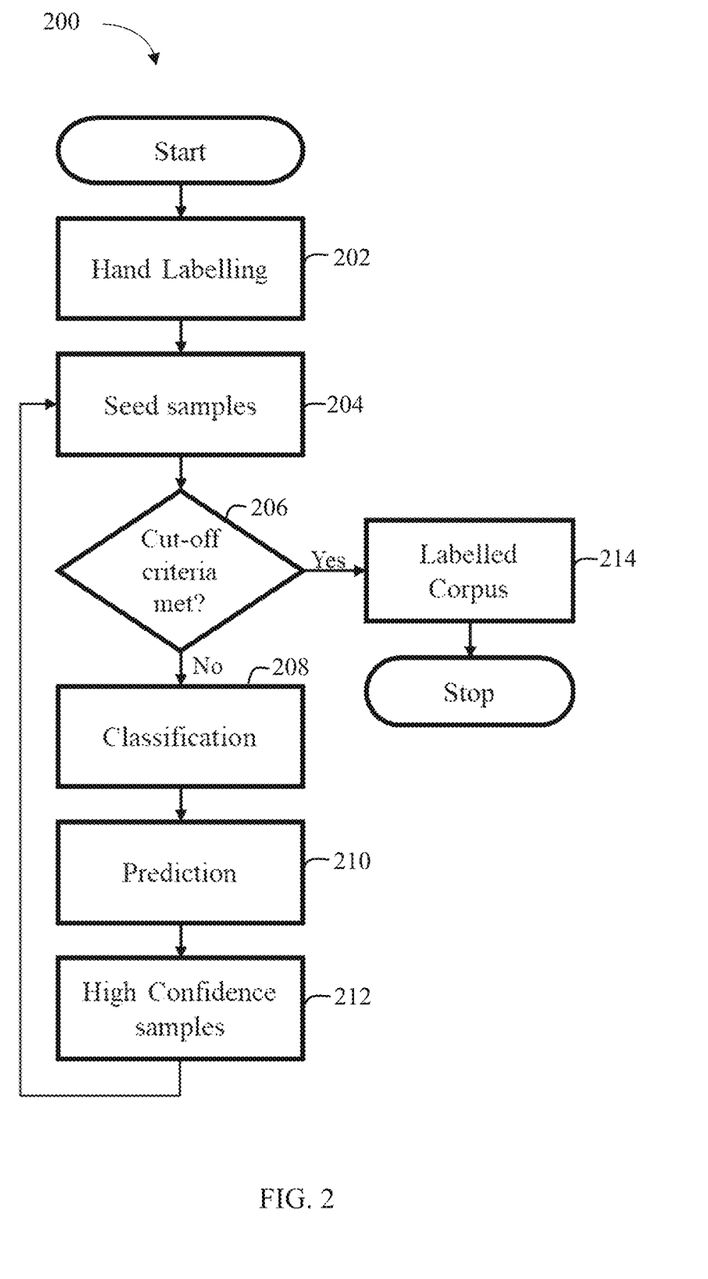
FIG. 2 is a flow chart of an iterative training process used to train a machine learning (ML) system, according to various embodiments.

FIG. 2 is a flow chart of an iterative lightly supervised training process 200 that includes a sequence of steps that correspond to different blocks of the system 100 (FIG. 1) as noted below. First, a small sample set of entities from a subset of documents selected from a corpus of documents is manually annotated or recognized by a subject matter expert. The initially selected samples are used as seed samples or the initial training dataset by the iterative training process 200. The size of the initial training dataset generally increases after each iteration. The process 200 ends upon reaching a termination condition. The steps of the process 200 are explained in detail below.

The first step (not shown) is to select an initial subset of documents from a corpus of available documents. The selected subset of documents is manually labeled, i.e., the entities in the selected subset of documents are recognized and labeled accordingly by a subject matter expert. The manually labeled entities serve as seed entity samples from which labels for other documents in the corpus may be generated by an embodiment of an AI/ML system, referred to as an entity classifier. Therefore, the subset of documents is selected in such a way that the selected documents (also referred to as seed documents) include a diverse range of entities that are representatives of the entities in the documents in the entire corpus.

A number of techniques can be used for selecting the seed documents. Examples of such techniques include, but are not limited to k-means clustering, mean shift clustering, density-based spatial clustering, expectation-maximization (EM) clustering, hierarchical clustering, etc. Each document in the corpus of documents can be encoded into a suitable sentence embedding. The sentence embeddings can then be clustered using k-means clustering, where the number of clusters k may be the same as number of seed documents. The number of seed documents may be selected to be a small fraction (e.g., 10%, 5%, 2%, 1%, 0.5%, 0.2%, etc.) of the total number of documents in the corpus of documents. Thereafter, from each cluster, the document corresponding to the centroid of the cluster may be included into the seed documents. A set of seed documents generated in this manner may represent the entire corpus without significant class bias.

After the selection of seed documents, a subject matter expert (SME) may be tasked with annotating the selected documents. In step 202, the SME may tag each word or a group of words (a sequence of characters, in general) in each seed document to its category, i.e., a named entity. For example, a physician as an SME may label the descriptions from a lab report that are indicative of certain physiological conditions as potential physiological conditions. This step corresponds to the block 108 of the system 100 (FIG. 1).

In general, named entity recognition (NER) is a sequential tagging problem. Commonly used tagging formats include the IOB (Inside-Outside-Beginning) format and the related IOB-2 format. According to the IOB-2 format, the first word of a phrase corresponding to an identified entity is tagged "B" and the rest of the words in the phrase are tagged "I." The words that are not part of any entity are tagged "O." In some embodiments, the SME and the entity classifier use the IOB-2 format. Table 2 below shows an example of IOB tagging.

TABLE 2

Example of IOB Tagging

| Sentence # | Token | Tag |
|---|---|---|
| Sentence: 1 | Thousands | O |
| | of | O |
| | demonstrators | O |

TABLE 2-continued

Example of IOB Tagging

| Sentence # | Token | Tag |
|---|---|---|
| | have | O |
| | marched | O |
| | through | O |
| | London | B-geo |
| | to | O |
| | protest | O |
| | the | O |
| | war | O |
| | in | O |
| | Iraq | B-geo |
| | and | O |
| | demand | O |
| | the | O |
| | withdrawal | O |
| | of | O |
| | British | B-gpe |
| | troops | O |
| | from | O |
| | that | O |
| | country | O |
| | . | O |

In the example above, the contents of a document include the sentence "Thousands of demonstrators have marched through London to protest the war in Iraq and demand the withdrawal of British troops from that country." In this sentence each token (e.g., a word, a group of characters, in general) is tagged. Two tokens: "London" and "Iraq" are both tagged as "B-geo" indicating the beginning of a geographical entity. The token "British" is tagged as "B-gpe" indicating the beginning of a geopolitical entity. All other tokens are tagged "O" i.e., as "other." If the sentence were to include the city name "Los Angeles," the token "Los" would be tagged "B-geo" and the token "Angeles" would be tagged "I-geo" indicating that it is the inside token in a geographical entity.

In different embodiments, the use of other tagging formats, e.g., IOE1, IOBES, etc., is contemplated. In the IOE1 format, an "E" tag used to mark the last token of a chunk immediately preceding another chunk of the same named entity. In the IOBES format, the tag "S" is used to represent a chunk containing a single token, and chunks of length greater than or equal to two always start with the "B" tag and end with the "E" tag. After all the entities in the sample documents are identified and labeled, an initial set of labeled entities, also called seed samples, 204 is available.

As the training process 200 is iterative, step 206 determines if a termination condition is reached. If not, the set of labeled entities is used to train an entity classifier (an embodiment of an AI/ML system, in general) to perform NER via classification, at step 208. This step corresponds to block 112 in the system 100 (FIG. 1). In the first iteration, the set of labeled entities includes or essentially consists of the seed samples. The training in the first iteration yields an initial machine learning (ML) model (e.g., as described with reference to blocks 112, 114 of the system 100 (FIG. 1), that can be used to configure a typical AI/ML system as a trained entity classifier.

To perform NER, many different sequence modelling techniques can be used. In some embodiments, a hybrid of conditional random fields (CRF) and long short-term memory (LSTM) techniques (discussed below) is used to build an embodiment of the entity classifier. In some embodiments, other modelling techniques can also be used to build different embodiments of the entity classifier. In general, any sequence modelling technique, e.g., recurrent neural network (RNN), gated recurrent unit (GRU) network, etc., can be used.

After the initial model is obtained, the initially trained entity classifier is leveraged in step 210, i.e., the entity classifier is used to predict labels for the unlabeled entities of the documents in the corpus. This step corresponds to block 116 of the system 100 (FIG. 1). Along with predicting labels, the entity classifier also provides confidence scores of each prediction. In some cases, the entity classifier may assign probabilities to different labels, where each probability indicates the correctness of the corresponding label if assigned to the identified entity, and the confidence score may be the maximum of the probabilities across different labels. In other cases, the confidence score of a prediction is calculated using the softmax function, which provides the possible probabilities of each class for a tag. The class with the maximum probability is then assigned to the tag.

The prediction accuracy of a classifier generally increases with the size of the training dataset. Since the entity classifier was trained using only a relatively small set of labeled entities, many labeling outcomes may be inaccurate. A few predictions, however, may be accurate and may have a high confidence score. The classifier-labeled entities (also referred to as machine-labeled entities) that are associated with a high confidence score are selected in step 212, and are added to the set of labeled entities in step 204. The updated set of labeled entities is then used as the updated, larger training dataset for the next training iteration. The labels provided by the predictions having a low confidence score are removed from the corresponding entities, so that those entities become unlabeled again, for the next iteration.

The threshold confidence score that distinguishes between high and low confidence scores may depend on the nature of the documents to be analyzed and can be specified by the user. For example the threshold confidence score, expressed as a percentage, can be 50%, 60%, 75%, 85%, 90%, 98%, etc. The prediction confidence scores at least equal to the threshold confidence score may be considered high confidence scores, and the prediction confidence scores less than the threshold confidence score may be considered low confidence scores. Choosing a high threshold confidence score can increase the time required to complete the entire training process, though this can also increase the quality of the labeling. A threshold confidence score may be selected to achieve a balance between prediction/training time and quality. The threshold confidence score may be increased in one or more later iterations.

Instead of adding classifier-labeled entities to the set of labeled entities, as described above, in some embodiments, entire documents having high aggregate entropy scores are added to the seed documents after the first iteration, to obtain a set of labeled documents and, in later iterations, to the set of labeled documents. The entropy score can be calculated for each entity using the confidence score, e.g., that obtained using the softmax function. Since the entity classifier trained to perform NER generally provides a confidence score for each labeled entity, an aggregate confidence score for a document can be calculated by aggregating, e.g., by computing the mean of the respective entropy scores associated with all the entities in a document. Aggregating can also be defined as the minimum of the entropy scores associated with all the entities in the document. The documents having an aggregate score greater than or equal to a threshold aggregate entropy score may be added to the seed documents (after the first iteration), to provide a set of labeled documents, and to the set of labeled documents (after the later iterations). In the case where the aggregate is the minimum of the entropy scores associated with all the entities in the document, a document is qualified to be a new seed if all the entities in the document are extracted with respective entropy scores more than the threshold value. The updated set of labeled entities generated in step 204 would then include or essentially consist of all the labeled entities in the set of labeled documents.

Steps 204 through 212 are repeated until the termination condition is reached. In each iteration, the entity-classifier is refined using the expanded training dataset, and a refined, generally improved ML model is obtained. When the termination condition is reached, a final entity-prediction ML model is obtained along with a labeled corpus, in step 214. In the different iterations of the process 200, the refined entity classifier is used to obtain more labeled entities. The termination condition can be a specified number of iteration cycles, or a target number of labeled entities/documents in the updated labeled entities set/updated labeled documents set. In the latter case, the iterations are terminated when the size of the labeled entities set/labeled document set reaches or exceeds the corresponding target numbers. Termination condition may also include determining whether the number of classifier-labeled entities having a high confidence score is at least equal to a specified labeled-entity-increment threshold. If one or a specified number of iterations do not produce classifier-labeled entities having a high confidence score at least equal to the labeled-entity-increment threshold, the iterations may be terminated.

The process 200 may be controlled using one or more hyper-parameters that can be selected by the user. The first hyper parameter is the number of clusters (k), i.e., the number of seed documents. Another hyper parameter is the confidence score threshold, as discussed above. Maximum number of iterations, described above, is yet another hyper parameter. Yet another hyper parameters is a cut-off labeled-entity percentage. If the percentage of classifier-labeled entities having confidence scores above the threshold confidence score after one or more iterations is less than the cut-off labeled-entity percentage, the iterations may be terminated. The iterations are also terminated if the size of the labeled entity set becomes equal to the total number of entities in the document corpus because, upon reaching this condition, there are no more unlabeled entities left in any document in the document corpus.

Figure 3:
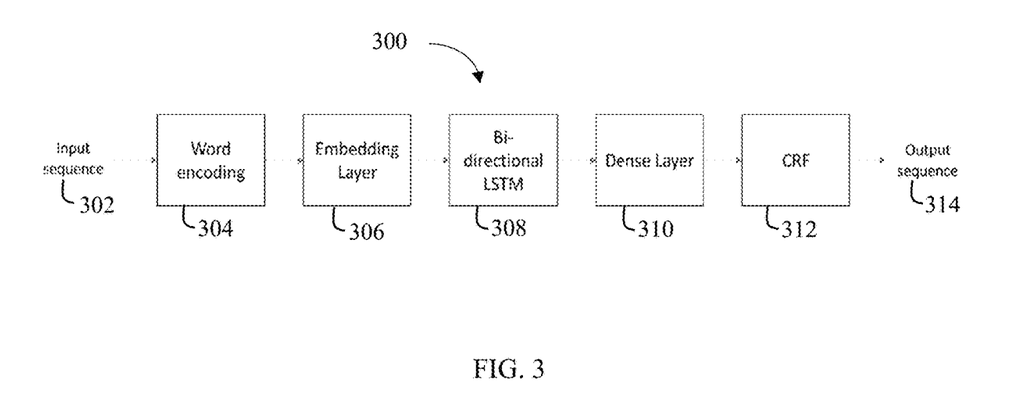
FIG. 3 schematically shows a hybrid classifier that can perform named entity recognition (NER), according to one embodiment.

FIG. 3 schematically shows a hybrid classifier 300 that can be used as an entity classifier. In the classifier 300, an unlabeled sequence of words (characters, in general) 302 is received by a word encoder 304, that converts each unique word in the sequence 302 into a respective unique numerical sequence or a unique index. The embedding layer 306 generates an embedding matrix that provides certain number of latent factors, 16, 32, 30, 64, etc., for each index, representing information about the corresponding word. Using the indices and the latent factors, the words in the input sequence 302 are represented as numerical vectors.

The numerical vectors are analyzed by a bi-directional long short-term memory network (Bi-LSTM) 308. A Bi-LSTM is a type of a recurrent neural network (RNN) that is well-suited to predict the next word given a sequence of words by learning information about the context of the words. A conventional RNN remembers all the information it has learned. This can cause an RNN to become inefficient while analyzing long sequences of words. For example, the processing speed of the RNN may decrease or it may run out of memory. The LSTM selectively forgets certain learned information that is later determined to be less important or unnecessary, and can thus increase processing efficiency in terms of processing speed and/or required memory capacity. The bidirectional LSTM 308 can not only analyze the past sequence but also at least a part of the future sequence to predict words in the sequence, so as to infer the meaning of the input sequence.

The information learned by the Bi-LSTM 308 is presented to the dense layer 310, which is a fully connected layer that compiles all the information learned and outputs a prediction, i.e., the expected next word in the input sequence 302. This information is then received by conditional random fields (CRF) network 312. A CRF is a probabilistic model that performs predictions taking into account the context of the input sequence. The CRF 312 analyzes the input sequence 302 and the information provided by the dense layer 310 and provides a final prediction as to the label(s) to be assigned to one or more words or identified entities in the input sequence. The CRF 312 thus provides the final prediction in the form of a labeled output sequence 314, i.e., labeled entities, when the input sequence 302 includes unlabeled entities/words in a document.

The use of the trained ML-models, such as those derived at block 114 of the system 100 (FIG. 1) or in the step 208 (FIG. 2), in the context of invoice processing is discussed below. It should be understood, however, that invoice is only one type of documents that can be analyzed by the techniques described herein. Various embodiments can process and extract information from and, in particular, identify named entities in any type of documents such as, e.g., system/component designs, processing recipes, scientific-analysis reports, lab reports, bank statements, etc.

Figure 4A:
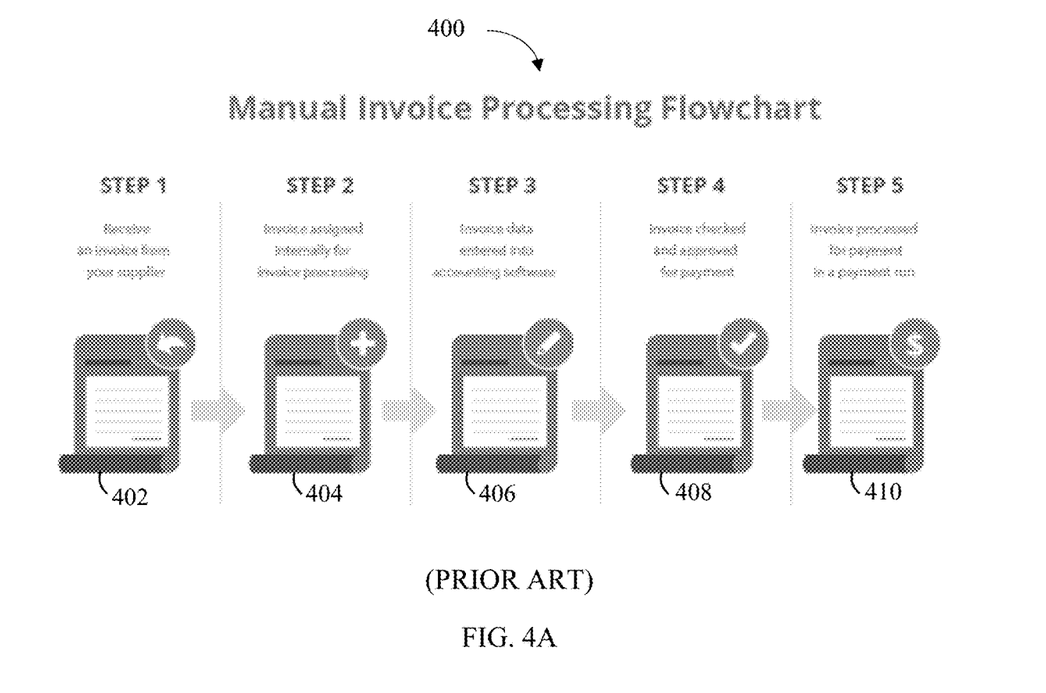
FIG. 4A is a flow chart of a typical manual invoice processing procedure that can be augmented using an embodiment of an ML-system trained using the system shown in FIG. 1.

FIG. 4A is a flow chart of a typical manual invoice processing procedure. Invoice processing as used herein refers to the entire process for handling a supplier invoice, from its receipt to when it has been posted in the enterprise resource planning (ERP) system, and is ready for payment. With reference to FIG. 4A, in the process 400, an invoice is received at step 402. The invoice may be received in different formats, such as paper, PDF, or e-invoice, etc. In step 404, the invoice may be assigned to a human processor. The human processor may be selected randomly or based on information such a human processors that are currently available, those that belong to the department to which the invoice is directed, etc. In step 406, the human processor enters the invoice data manually in the recipient's ERP system. In this, the invoice amounts may be designated to the appropriate account, project, and/or cost center. In step 408, the invoice may be distributed to a responsible authorizer (e.g., a budget owner) for review and invoice approval. In step 410, payment is processed for approved invoices.

Using an invoice automation solution, the entire invoice processing procedure 400 can be automated for quicker, efficient, and/or less error prone invoice processing. Embodiments of the ML-system described herein that can be trained to perform named entity recognition (NER), can be used to process invoices in a digital workflow. Various embodiments can extract invoice information and present it in a standardized format, so that the information can be received automatically by the ERP.

Figure 4B:
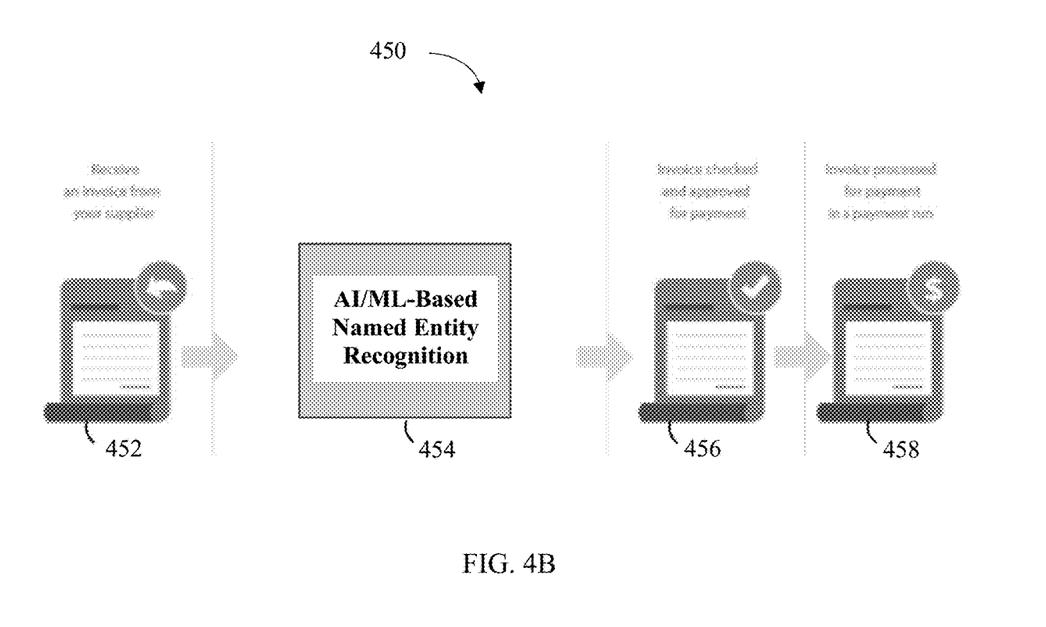
FIG. 4B is a flow chart of an ML-module-based invoice processing procedure, according to various embodiments.

FIG. 4B is a flow-chart of an exemplary invoice processing procedure 450, employing an ML module trained as described above, to perform NER. In the procedure 450, the steps 452, 456, and 458 are substantially the same as the steps 402, 408, and 410, respectively, from the process 400. The step 404 in the procedure 400 is eliminated, however, and the step 406 is replaced with the step 454, where NER is performed by a classifier or a set of classifiers (one or more embodiments of an AI/ML system, in general) configured using one or more vendor-specific ML-models and/or a universal ML-model, as described above.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept.

What is claimed is:

1. A method for training a machine-learning (ML) system, the method comprising:
   (a) providing a seed set of labeled entities as a labeled entities set based on a first cluster of a plurality of clusters of documents and using the labeled entities set to train the ML system, to obtain an ML model;
   (b) using the trained ML system to predict labels for entities in an unlabeled entities set, yielding a machine-labeled entities set, the prediction providing a respective confidence score for each machine-labeled entity;
   (c) selecting from the machine-labeled entities set, a subset of machine-labeled entities having a respective confidence score at least equal to a threshold confidence score;
   (d) updating the labeled entities set by adding thereto the selected subset of machine- labeled entities;
   (e) removing from the machine-labeled entities set the selected subset of machine-labeled entities and deleting labels assigned to the entities in the updated machine-labeled entities set to provide the unlabeled entities set for a next iteration;
   (f) if a termination condition is not reached, repeating steps (a) through (e), and, otherwise, storing the ML model;
   (g) selecting a second cluster from the plurality of clusters; and
   (h) repeating the steps (a) through (f) for the second cluster to store a different ML model for the second cluster, wherein providing the seed set in step (a) is based on the second cluster.

2. The method of claim 1, wherein the seed set comprises manually labeled entities from a subset of documents in the first cluster or a corpus of documents, the subset size not exceeding a specified fraction of the first cluster size or corpus size.

3. The method of claim 2, wherein the specified fraction is in a range 0.1% up to 10%.

4. The method of claim 2, further comprising:
   selecting the subset of documents using k-means clustering.

5. The method of claim 2, wherein each cluster of the plurality of clusters is being-associated with a respective document source.

6. The method of claim 1, further comprising:
   using another ML system to:
   identify sources of documents in a corpus of documents; and
   generate the plurality of clusters based on the identified sources of documents.

7. The method of claim 6, wherein:
   the corpus of documents comprises a plurality of invoices; and
   the sources of documents comprise one or more vendors supplying one or more of the plurality of invoices.

8. The method of claim 1, wherein the termination condition comprises one or more of:

a maximum number of iteration cycles;
a target size of the labeled entities set;
a minimum size of the machine-labeled entities set in one iteration; or
a minimum cumulative size of the machine-labeled entities sets across a plurality of iterations.

9. The method of claim 1, wherein the ML-system comprises a hybrid of conditional random fields (CRF) and a long short-term memory (LSTM) classifier.

10. The method of claim 1, wherein the labels that the trained ML system predicts for the entities in the unlabeled entities set are in an inside-outside-beginning (IOB) format.

11. A system for providing a machine-learning (ML) model, the system comprising:
a processor; and
a memory in communication with the processor and comprising instructions which, when executed by the processor, program the processor to:
(a) provide a seed set of labeled entities as a labeled entities set based on a first cluster of a plurality of clusters of documents and use the labeled entities set to train a machine learning (ML) module, to obtain the ML model;
(b) use the trained ML module to predict labels for entities in an unlabeled entities set, yielding a machine-labeled entities set, the prediction providing a respective confidence score for each machine-labeled entity;
(c) select from the machine-labeled entities set, a subset of machine-labeled entities having a respective confidence score at least equal to a threshold confidence score;
(d) update the labeled entities set by adding thereto the selected subset of machine-labeled entities;
(e) remove from the machine-labeled entities set the selected subset of machine-labeled entities and delete labels assigned to the entities in the updated machine-labeled entities set to provide the unlabeled entities set for a next iteration;
(f) if a termination condition is not reached, repeat operations (a) through (e) and, otherwise, store the ML model;
(g) select a second cluster from the plurality of clusters; and
(h) repeat the steps (a) through (f) for the second cluster to store a different ML model for the second cluster, wherein providing the seed set in step (a) is based on the second cluster.

12. The system of claim 11, wherein the seed set comprises manually labeled entities from a subset of documents in the first cluster or a corpus of documents, the subset size not exceeding a specified fraction of the first cluster size or corpus size.

13. The system of claim 12, wherein the specified fraction is in a range 0.1% up to 10%.

14. The system of claim 12, wherein the instructions further program the processor to:
select the subset of documents using k-means clustering.

15. The system of claim 12, wherein each cluster of the plurality of clusters is associated with a respective document source.

16. The system of claim 11, wherein the instructions further program the processor to:
use another ML module to:
identify sources of documents in a corpus of documents; and
generate the plurality of clusters based on the identified sources of documents.

17. The system of claim 16, wherein:
the corpus of documents comprises a plurality of invoices; and
the sources of documents comprise one or more vendors supplying one or more of the plurality of invoices.

18. The system of claim 11, wherein the termination condition comprises one or more of:
a maximum number of iteration cycles;
a target size of the labeled entities set;
a minimum size of the machine-labeled entities set in one iteration; or
a minimum cumulative size of the machine-labeled entities sets across a plurality of iterations.

19. The system of claim 11, wherein the ML module comprises a hybrid of conditional random fields (CRF) and a long short-term memory (LSTM) classifier.

20. The system of claim 11, wherein the labels that the trained ML module predicts for the entities in the unlabeled entities set are in an inside-outside-beginning (IOB) format.

* * * * *

UNITED STATES PATENT AND TRADEMARK OFFICE
CERTIFICATE OF CORRECTION

PATENT NO. : 11,886,820 B2
APPLICATION NO. : 17/064028
DATED : January 30, 2024
INVENTOR(S) : Menon et al.

It is certified that error appears in the above-identified patent and that said Letters Patent is hereby corrected as shown below:

In the Claims

In Column 14, Claim number 5:
Line 53, delete "being-".

Signed and Sealed this
Twelfth Day of March, 2024

*Katherine Kelly Vidal*

Katherine Kelly Vidal
*Director of the United States Patent and Trademark Office*